Patented June 22, 1954

2,681,859

UNITED STATES PATENT OFFICE 2,681,859

LIQUID POLISHING COMPOSITION

Paul E. Wenaas, Clarendon Hills, Ill., assignor to Simoniz Company, a corporation of Delaware No Drawing. Application August 12, 1950,
Serial No. 179,086

5 Claims. (Cl. 106—10)

This invention relates to a liquid polishing composition.

One of the features of this invention is to provide a liquid polishing composition capable of being spread substantially uniformly over a surface and of being buffed to a high luster, and including a volatile solvent, a wax at least partially dissolved in said solvent at ordinary temperatures, and a silicone fluid dissolved in said solvent. A specific feature of the invention is the provision of such a liquid polishing composition comprising 78 parts by weight of a volatile hydrocarbon solvent, 1.5 parts of "Crown 23" oxidized microcrystalline wax, 1.0 part of a silicone fluid consisting of a chain of dimethyl siloxane units and having a viscosity at room temperature of approximately 200 centistokes, and 0.5 part of "Ceralan" lanolin alcohols.

Other features of the invention will be apparent from the following description of certain embodiments of the invention.

The liquid polishing composition of this invention is useful in applying protective coatings to surfaces and to give them a high luster. The composition is particularly useful on lacquered and other metal surfaces such as are used in automobile bodies. Unlike the ordinary wax polishes which usually incorporate a mixture of hard and soft waxes, the composition of this invention after it has been applied and dried requires relatively little rubbing to achieve a high luster. This is true because the excess polishing ingredients that are applied in the polish are kept to a minimum so that extended rubbing to remove excess material is not required. In applying the composition of this invention, it is spread smoothly and uniformly over the surface with a cloth or the like and then permitted to dry. A second cloth is then used to buff the coating now on the surface and to bring out the luster. As is true with ordinary wax polishes, it is necessary that the surface be clean and dry.

The liquid polishing composition of this invention is capable of being spread substantially uniformly over a surface and of being buffed to a high luster. The composition includes a volatile solvent, a wax that is at least partially dissolved in the solvent at ordinary temperatures and a silicone fluid dissolved in the solvent. The wax is preferably a microcrystalline wax, particularly an oxidized microcrystalline wax, and it is preferred that the wax be present in an amount such that at ordinary room temperatures an undissolved portion of the wax remains in the form of a finely-divided suspension of discrete particles in the liquid, with these particles being capable of being redistributed through the liquid on agitation after they have settled to the bottom such as occurs when the composition is permitted to stand. There is also preferably employed an additive for the wax to aid in spreading the wax so that a substantially uniform coating is obtained. This additive is also soluble in the solvent.

The ingredients in the composition are preferably employed in the following proportions:

| | Parts by weight |
|---|---|
| Solvent | 78 |
| Wax | 0.75–3.0 |
| Additive | 0.25–1.5 |
| Silicone fluid | 0.5–3.5 |

As the additive and the silicone fluid are used to modify somewhat the characteristics of the wax and to aid in spreading the wax to obtain a substantially uniform coating, the amounts of additive and silicone are to a certain extent dependent upon the amount of wax. When the wax is employed in a minimum amount that approaches the bottom of its range as set out above, the amounts of additive and silicone fluid that are employed should also be adjacent the bottoms of their ranges. This is true because when the amount of wax approaches the minimum, this amount is so small that relatively small changes in the amounts of additive and silicone fluid has a relatively large effect upon the change of the ratio of the additive and silicone fluid to the wax. However, when the wax is employed in an amount that is greater than this minimum, and approaching the top of its range, the additive and the silicone fluid can each be used in an amount within the entire corresponding range.

The additive may be lanolin alcohols such as "Ceralan," preferably in an amount of 0.25 to 1.5 parts by weight. The "Ceralan" is a ceraceous mixture of monohydroxyl alcohols obtained by splitting lanolin by pressure hydrolysis in the presence of suitable catalysts. The components of this material may be divided into three general groups of approximately the following formula:

| | Per cent |
|---|---|
| Sterols (cholesterol) | 30 to 32 |
| Triterpene alcohols (lanosterol) | 25 to 27 |
| Aliphatic alcohols | the remainder |

The specification of "Ceralan" is as follows:

| | |
|---|---|
| Unsaponifiable | 97% |
| Saponifiable | 3% |
| Acetyl value | 130 |
| Iodine No | 30/40 |
| Melting point | 58/60° C. |
| Moisture | 0.10% |
| Ash | 0.25% |
| Specific gravity @ 15.5° C | 0.965 |

This material is made by Robinson, Wagner Co. Inc., 110 E. 42nd Street, New York 17, New York, and described in publications of the manufacturer.

The solvent that is employed in the new liquid polishing composition is preferably a hydrocarbon solvent that has sufficient volatility to dry in a reasonably short time after the polishing composition has been applied and that is capable of dissolving at least a portion of the wax at ordinary temperatures and of dissolving the silicone fluid and, where used, the additive. A suitable solvent has been found to be "Amsco Napthol Mineral Spirits" made by American Mineral Spirits Company of 230 No. Michigan Avenue, Chicago, Illinois and 155 East 44th Street, New York, New York. This particular solvent has an A. P. I. gravity at 60° F. of 50, specific gravity at 60° F. of .7796, a weight at 60° F. of 6.49 pounds per gallon and an initial boiling point of 290° F.

A wax that is preferably used in the new liquid polishing composition is a microcrystalline wax, and especially an oxidized microcrystalline wax. An excellent wax for this purpose has been found to be "Crown 23" oxidized microcrystalline wax made by Petrolite Corporation, Ltd., 30 Broad Street, New York 4, New York. This wax is described in a technical bulletin of the company entitled "Petrolite Crown Quality Emulsifiable Waxes." The wax has a melting point of 180–185° F., a penetration at 100 g. and 5 sec. of 6 max., an N. P. A. color of 6 max., an acid number of 20 to 25 and a saponification number of 55 to 65. Other waxes that may be used are "Crown 500," "Crown 700" and "Crown 1035." These are also made by Petrolite Corporation, Ltd. and are described in a technical bulletin of the company entitled "Petrolite Crown Quality Microcrystalline Waxes." "Crown 500" has a melting point of 190–195° F., a penetration with 100 grams and 5 sec. of 10 max., and an N. P. A. color of 2 to 2½. "Crown 700" has the same melting point and color, but has a penetration of 5 max. "Crown 1035" has the same color range, but has a melting point of 195–200° F. and a penetration of 2 max. The preferred wax, however, is the oxidized microcrystalline wax, such as "Crown 23." The waxes that are used may be single waxes or may be blends of two or more waxes.

The liquid silicone fluid that may be used is one consisting of chains of dimethyl siloxane units and having a viscosity at room temperature of approximately 200 centistokes. An excellent silicone fluid has been found to be "DC-200" made by Dow Corning Corporation and described in a technical publication entitled "Dow Corning Silicone Note Book—Fluid Series No. 3—Issued September 1948." Another excellent silicone fluid is General Electric "9996–200" silicone oil. The preferred silicone fluid is one having a viscosity of about 50–1000 centistokes and preferably approximately 200 centistokes.

In making the liquid polishing composition, all ingredients may be added to a steam heated vessel and heated until the mixture is clear. This mixture is then stirred to insure uniformity and is then ready for packaging. As soon as the heated solution cools to ordinary temperatures, any wax in excess of that which will be dissolved at the particular temperature precipitates out in very fine particles that on standing fall to the bottom, but that can be redispersed by merely shaking the container.

In order to insure a suspension of excess wax, this wax should be present in such an amount that it is not completely dissolved at ordinary temperatures. One example of the new polishing composition consists of:

| | Parts by weight |
|---|---|
| "Amsco Napthol Mineral Spirits" | 78 |
| "Crown 23" | 1.5 |
| "9996–200" liquid silicone of approximately 200 centistokes viscosity | 1.0 |
| "Ceralan" | 0.5 |

As indicated previously, the liquid polishing composition of this invention may be easily applied to the surface to be polished and provided with a protective coating. A body of the composition is agitated such as by shaking until the dispersed particles of excess wax have been substantially uniformly distributed. The composition is then applied to the surface by means of a cloth or the like and permitted to dry. On drying the finish will be somewhat dull and contain the powdery wax particles that were in the suspension. A solvent should be used that does not require too long to dry. After drying is complete, a dry cloth is used to remove excess wax and polish and buff the surface to bring out the luster. After this has been done, the surface will have a high luster and the ingredients of the composition will be spread uniformly.

Having described my invention as related to various embodiments of the same, it is my intention that the invention be not limited by any of the details of description unless otherwise specified, but rather be construed broadly within its spirit and scope as set out in the accompanying claims.

I claim:

1. A liquid polishing composition consisting essentially of: 78 parts by weight of a volatile solvent; 0.75 to 3.0 parts by weight of an oxidized microcrystalline wax soluble in said solvent and in an amount such that at ordinary room temperatures an undissolved portion remains in the form of a suspension, said suspension being in the form of discrete particles that are distributed through the liquid on agitation; 0.5 to 3.5 parts of polyorganosiloxane fluid dissolved in said solvent, said fluid consisting essentially of chains of dimethyl siloxane units and having a viscosity at room temperature of approximately 50 to 1,000 centistokes; and 0.25 to 1.5 parts by weight lanolin alcohols dissolved in said solvent, said silicone fluid and lanolin alcohols being employed in amounts adjacent the bottoms of their ranges when the wax is employed in a minimum amount, but being capable of being employed in amounts over their entire ranges when the wax is employed in an amount that is greater than said minimum amount.

2. A liquid polishing composition consisting essentially of: 78 parts by weight of a volatile hydrocarbon solvent; 0.75 to 3.0 parts by weight of an oxidized microcrystalline wax at least partially dissolved in said solvent having a melting point of 180–185° F., a maximum penetration with 100 grams of 6, an N. P. A. color of 4½ to 6, an acid number of 20 to 25 and a saponification number of 55 to 65; 0.5 to 3.5 parts of a silicone fluid dissolved in said solvent consisting of chains of dimethyl siloxane units and having a viscosity at room temperature of approximately 50 to 1000 centistokes; and 0.25 to 1.5 parts of lanolin alcohols dissolved in said solvent, said silicone fluid and lanolin alcohols being employed in amounts adjacent the bottoms of their ranges when the wax is employed in a minimum amount, but being capable of being employed in amounts over their entire ranges when the wax is employed in an amount that is greater than said minimum amount.

3. A liquid polishing composition consisting essentially of: 78 parts by weight of a volatile hydrocarbon solvent; 0.75 to 3.0 parts by weight of an oxidized microcrystalline wax at least partially dissolved in said solvent having a melting point of 180–185° F., a maximum penetration with 100 grams of 6, an N. P. A. color of 4½ to 6, an acid number of 20 to 25 and a saponification number of 55 to 65; 0.5 to 3.5 parts of a silicone fluid dissolved in said solvent consisting of chains of dimethyl siloxane units and having a viscosity at room temperature of approximately 200 centistokes; and 0.25 to 1.5 parts of lanolin alcohols dissolved in said solvent, said silicone fluid and lanolin alcohols being employed in amounts adjacent the bottoms of their ranges when the wax is employed in a minimum amount, but being capable of being employed in amounts over their entire ranges when the wax is employed in an amount that is greater than said minimum amount.

4. A liquid polishing composition consisting essentially of: 78 parts by weight of a volatile hydrocarbon solvent; 0.75 to 3.0 parts by weight of an oxidized microcrystalline wax at least partially dissolved in said solvent; 0.5 to 3.5 parts of a silicone fluid dissolved in said solvent consisting of a chain of dimethyl siloxane units and having a viscosity at room temperature of approximately 200 centistokes; and 0.25 to 1.5 parts of lanolin alcohols dissolved in said solvent, said silicone fluid and lanolin alcohols being employed in amounts adjacent the bottoms of their ranges when the wax is employed in a minimum amount, but being capable of being employed in amounts over their entire ranges when the wax is employed in an amount that is greater than said minimum amount.

5. A liquid polishing composition, consisting essentially of: 78 parts by weight of a volatile hydrocarbon solvent; 1.5 parts of an oxidized microcrystalline wax; 1.0 parts of a silicone fluid consisting of a chain of dimethyl siloxane units and having a viscosity at room temperature of approximately 200 centistokes; and 0.5 part of lanolin alcohols.

References Cited in the file of this patent

UNITED STATES PATENTS

| Number | Name | Date |
| --- | --- | --- |
| 2,392,805 | Biefeld | Jan. 15, 1946 |
| 2,406,671 | Diamond | Aug. 27, 1946 |
| 2,482,888 | Walsh | Sept. 27, 1949 |
| 2,523,281 | Currie | Sept. 26, 1950 |
| 2,584,413 | Baer | Feb. 2, 1952 |
| 2,614,049 | Swanson | Oct. 14, 1952 |
| 2,626,870 | Cooke et al. | Jan. 27, 1953 |

OTHER REFERENCES

Warth, "Chemistry and Technology of Wax," Reinhold Publishing Corp., N. Y., N. Y., 1947, pages 374, 454 and 455.